(12) United States Patent
Yeh

(10) Patent No.: US 9,050,782 B2
(45) Date of Patent: *Jun. 9, 2015

(54) EXPANDED LAMINATE

(71) Applicant: Tzong In Yeh, Fremont, CA (US)

(72) Inventor: Tzong In Yeh, Fremont, CA (US)

(*) Notice: Subject to any disclaimer, the term of this patent is extended or adjusted under 35 U.S.C. 154(b) by 157 days.

This patent is subject to a terminal disclaimer.

(21) Appl. No.: 13/625,623

(22) Filed: Sep. 24, 2012

(65) Prior Publication Data

US 2013/0022799 A1  Jan. 24, 2013

Related U.S. Application Data

(63) Continuation-in-part of application No. 13/313,507, filed on Dec. 7, 2011.

(30) Foreign Application Priority Data

Jan. 27, 2011 (TW) .............................. 100103158 A
Aug. 10, 2011 (TW) .............................. 100128451 A

(51) Int. Cl.
*B32B 3/26* (2006.01)
*B32B 27/06* (2006.01)
*B32B 27/32* (2006.01)
*B32B 27/36* (2006.01)
*B32B 27/30* (2006.01)

(52) U.S. Cl.
CPC ....... *B32B 27/065* (2013.01); *Y10T 428/24942* (2015.01); *Y10T 428/24967* (2015.01); *B32B 2250/42* (2013.01); *B32B 27/32* (2013.01); *B32B 27/365* (2013.01); *B32B 27/308* (2013.01); *B32B 2250/03* (2013.01); *B32B 2250/246* (2013.01); *B32B 2250/40* (2013.01); *B32B 2266/025* (2013.01); *B32B 2305/022* (2013.01); *B32B 2307/558* (2013.01); *B32B 2307/56* (2013.01); *B32B 2307/72* (2013.01)

(58) Field of Classification Search
CPC ...... B32B 5/32; B32B 27/065; B32B 27/038; B32B 2250/03; B32B 2250/246; B32B 2307/72; B32B 2266/025; B32B 2305/022; B32B 2307/558; B32B 2307/56; B32B 2250/40
USPC .................... 428/316.6, 319.3, 319.7, 192
See application file for complete search history.

(56) References Cited

U.S. PATENT DOCUMENTS

| | | | | |
|---|---|---|---|---|
| 4,034,528 A | * | 7/1977 | Sanders et al. | 52/309.4 |
| 4,172,918 A | * | 10/1979 | Doerer | 428/174 |
| 5,009,043 A | * | 4/1991 | Kurrasch | 52/145 |
| 6,492,013 B1 | * | 12/2002 | Ramesh | 428/308.4 |
| 6,541,105 B1 | * | 4/2003 | Park | 428/304.4 |
| 7,029,349 B2 | | 4/2006 | Lin | |
| 7,160,164 B2 | | 1/2007 | Lin | |
| 7,430,795 B2 | | 10/2008 | Lin et al. | |
| 2001/0000568 A1 | * | 5/2001 | Bambara et al. | 83/701 |
| 2005/0126848 A1 | * | 6/2005 | Siavoshai et al. | 181/207 |
| 2007/0059515 A1 | * | 3/2007 | Cheung | 428/314.8 |
| 2009/0068439 A1 | * | 3/2009 | Callahan et al. | 428/319.7 |
| 2010/0064611 A1 | * | 3/2010 | Holt et al. | 52/309.4 |
| 2013/0022799 A1 | * | 1/2013 | Yeh | 428/215 |

* cited by examiner

*Primary Examiner* — Hai Vo
(74) *Attorney, Agent, or Firm* — Muncy, Geissler, Olds & Lowe, P.C.

(57) ABSTRACT

An expanded laminate includes a first plastic sheet, a first expanded sheet and a second expanded sheet. The first plastic sheet has a top surface and a bottom surface. The top surface of the first plastic sheet is bonded to a bottom surface of the first expanded sheet. The bottom surface of the first plastic sheet is bonded to a top surface of the second expanded sheet.

14 Claims, 9 Drawing Sheets

US 9,050,782 B2

EXPANDED LAMINATE

CROSS REFERENCE TO RELATED APPLICATIONS

This is a continuation-in-part of copending U.S. application Ser. No. 13/313,507, filed on Dec. 7, 2011, for which priority is claimed under 35 U.S.C. §120; and this application claims priority of Application No. 100128451, filed in Taiwan, R.O.C. on Aug. 10, 2011 and Application No. 100103158, filed in Taiwan, R.O.C. on Jan. 27, 2011 under 35 U.S.C. §119(e), the entire contents of all of which are hereby incorporated by reference.

BACKGROUND OF INVENTION

1. Field of Invention

The present invention relates to an expanded laminate and, more particularly, to an expanded laminate which can cushion and distribute impacts.

2. Related Prior Art

Expanded materials are often used in foam core or soft snow sliders and boards as well as soft body and surf boards since they are light and inexpensive and absorb shocks. As disclosed in U.S. Pat. Nos. 7,160,164, 7,029,349 and 7,430,795 for example, an expanded product generally includes a single expanded core and one expanded skin or more adhered to the expanded core. Such an expanded skin generally includes a plastic film, a bonding layer and an expanded layer. The density of the expanded layer is higher than the density of the expanded core.

Such expanded products are often subjected to impacts during use. For example, while surfing, a surfer exerts considerable impacts on and may compress or dent portions of a surf board corresponding to his or her hands, elbows, knees, feet, head and hips.

Referring now to FIG. 9, a conventional expanded body board product is shown. The expanded product includes an expanded core 90 wrapped in an outer layer or skin 91. A dent A is made in the expanded core 90 through the skin 91. The problem related to such dents is particularly serious where the expanded core 90 is made of expanded polystyrene ("EPS") or other material that cannot readily return to its original shape.

The present invention is therefore intended to overcome or at least alleviate the problems encountered in prior art.

SUMMARY OF INVENTION

It is an objective of the present invention to provide an expanded laminate comprising a first plastic sheet and first and second expanded sheets bonded to top and bottom surfaces of the plastic sheet, respectively. The first plastic sheet may be made of a polyethylene ("PE"), an oriented polypropylene ("OPP"), a polycarbonate ("PC") or similar material, including Surlyn® resin made by DuPont. The first plastic sheet preferably has a thickness between 0.05 mm and 1 mm. The first expanded sheet and the second expanded sheet may be made of any combination of expanded polyethylene ("EPE") and expanded polypropylene ("EPP"). The foam density of the first and second expanded sheets is preferably between 1.2 pcf and 8 pcf. The thickness of the first and second expanded layers is preferably between 1 mm and 8 mm. In addition, the first and second expanded sheets may respectively include a plurality of expanded layers.

Preferably, surface area of the top surface of the first plastic sheet is equal to or larger than surface area of the bottom surface of the first expanded sheet. And, surface area of the bottom surface of the first plastic sheet is equal to or larger than surface area of the top surface of the second expanded sheet.

The expanded laminate may further include a second plastic sheet having a top surface bonded to a bottom surface of the second expanded sheet. Moreover, the expanded laminate may further include a third expanded sheet having a top surface bonded to a bottom surface of the second plastic sheet. In the other word, the expanded laminate may have a plurality of plastic sheets and a plurality of expanded sheets laminated in interval sequentially.

Furthermore, the expanded laminate may have an outer layer, and a bottom surface of the outer layer is bonded to a top surface of the first expanded sheet. The expanded laminate may further have an inner layer, and a top surface of the inner layer is bonded to a bottom surface of the second expanded sheet or the expanded sheet located on an internal side of the expanded laminate.

In comparison with the prior art, the expanded laminate of the present invention effectively distributes and cushions impacts, forces and shock. When used as a product or part of a product, the expanded laminate provides excellent impact resistance and cushioning to prevent the product from dents, impact and shock.

Other objectives, advantages and features of the present invention will be apparent from the following description referring to the attached drawings.

BRIEF DESCRIPTION OF DRAWINGS

The invention is illustrated by the accompanying drawings in which corresponding parts are identified by the same numerals and in which.

DETAILED DESCRIPTION OF THE PREFERRED EMBODIMENT

Figure 1:
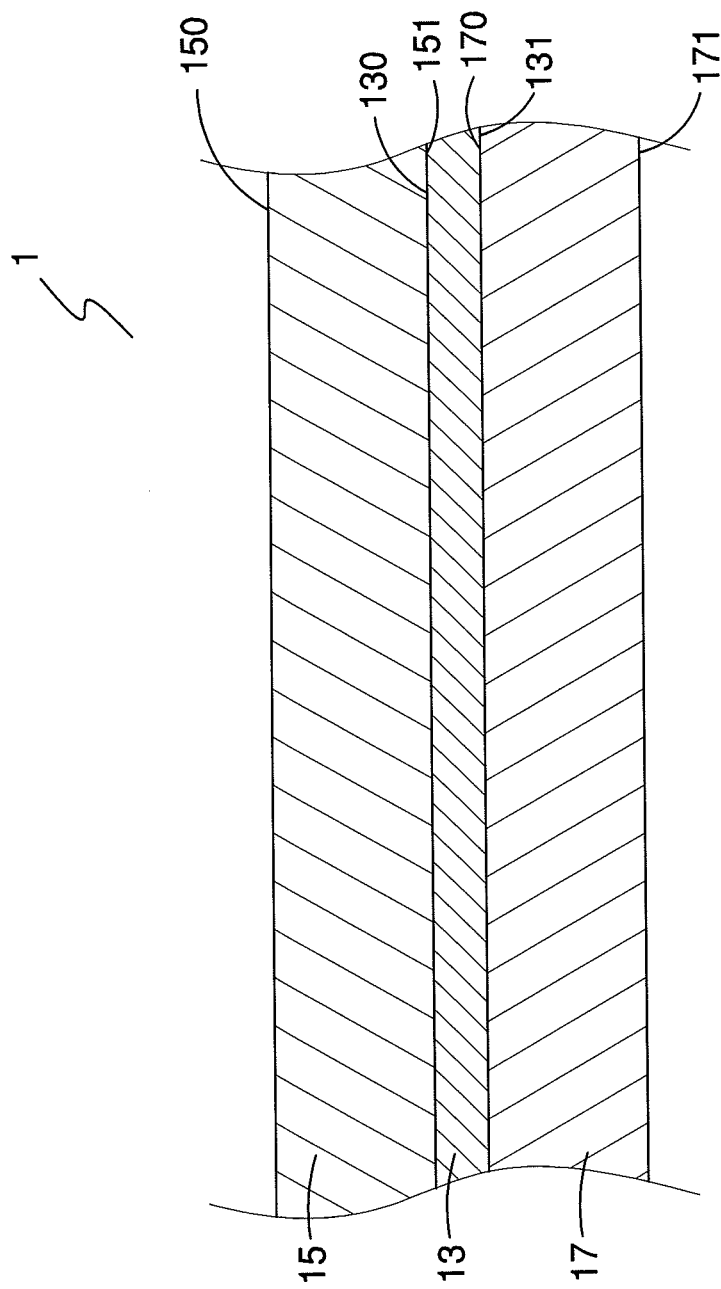
FIG. 1 is a partial cross-sectional view of an expanded laminate in accordance with the first embodiment of the present invention.

Referring to FIG. 1, an expanded laminate is shown in accordance with a first embodiment of the present invention. The expanded laminate 1 includes a first plastic sheet 13, a first expanded sheet 15 and a second expanded sheet 17. The first plastic sheet 13 has a top surface 130 and a bottom surface 131, wherein the top surface 130 is directly bonded to a bottom surface 151 of the first expanded sheet 15, and the bottom surface 131 is directly bonded to a top surface 170 of the second expanded sheet 17. In specific, the term "directly bonded to" means bonded to without using an adhesive, bonding layer or any other medium. Accordingly, the first plastic sheet 13 is bonded to the first expanded sheet 15 and the second expanded sheet 17 without adhesive or any other medium.

The first plastic sheet 13 may be made high-density, medium density, or low-density polyethylene ("PE"), oriented polypropylene ("OPP"), polycarbonate ("PC") or a durable material such as Surlyn® resin made by DuPont or similar durable material. The first plastic sheet 13 is preferably between about 0.05 mm and 1 mm thick. Both of the first expanded sheet 15 and the second expanded sheet 17 may be made of any combination of expanded polyethylene ("EPE") and expanded polypropylene ("EPP"). The foam density of the first expanded sheet 15 and the second expanded sheet 17 is preferably between about 1.2 and 8 pounds per cubic foot ("pcf"). The first expanded sheet 15 and the second expanded sheet 17 are preferably between about 1 mm and 8 mm thick. It should be noted that the thickness and foam density of the first expanded layer 15 and the thickness and foam density of the second expanded layer 17 may be identical or different. Moreover, the first and second expanded sheets 15 and 17 may be made of a plurality of expanded layers in order to increase thickness thereof to comply with various needs.

Figure 2:
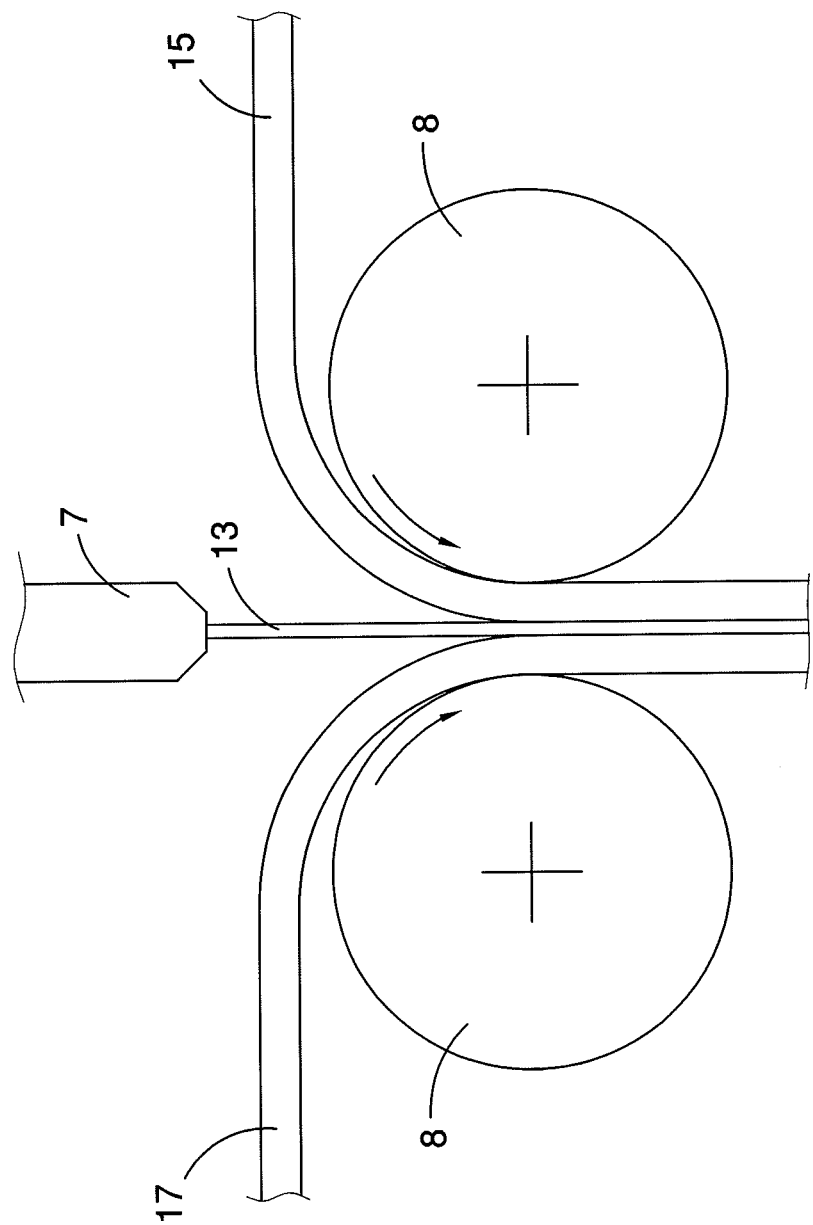
FIG. 2 is a partial side view showing one example of making the expanded laminate shown in FIG. 1.

Referring now to FIG. 2, it is one example showing how to bond the first plastic sheet 13 onto the first expanded sheet 15 and the second expanded sheet 17 without having to use an adhesive, bonding layer or other medium. At first, the first expanded sheet 15 and the second expanded sheet 17 are directed into a gap between two rollers 8 while the first plastic sheet 13 in a molten form is extruded from an extruder 7 and directed into a gap between the first expanded sheet 15 and the second expanded sheet 17. Then, the rollers 8 are driven to roll and sandwich the molten first plastic sheet 13 between the first and the second expanded sheets 15 and 17.

The first plastic sheet 13 is heated, molten and naturally adhesive when it is extruded from the extruder 7. Some of the heat of the first plastic sheet 13 acts to advantageously heat and melt a portion of the first expanded sheet 15 and a portion of the second expanded sheet 17 so that the portions of the first expanded sheet 15 and the second expanded sheet 17 are naturally adhered to the first plastic sheet 13. Thus, the top surface 130 of the first plastic sheet 13 and the bottom surface 151 of the first expanded sheet 15 are melted together during abovementioned process, and the bottom surface 131 of the first plastic sheet 13 and the top surface 170 of the second expanded sheet 17 are also melted together during abovementioned process. Accordingly, the first plastic sheet 13, the first expanded sheet 15 and the second expanded sheet 17 are firmly and uniformly bonded to one another after they are rolled by the rollers 8 and cooled. In addition, the first plastic sheet 13 becomes tough after it is cooled, and is able to cushion impacts exerted thereon through the first expanded sheet 15 or the second expanded sheet 17. Similarly, the expanded sheets 15 and 17 act to support the first plastic sheet 13. It should be noted that expanded laminate 1 disclosed in FIG. 1 can be disposed on any locations of a product to cushion impacts.

Figure 3:
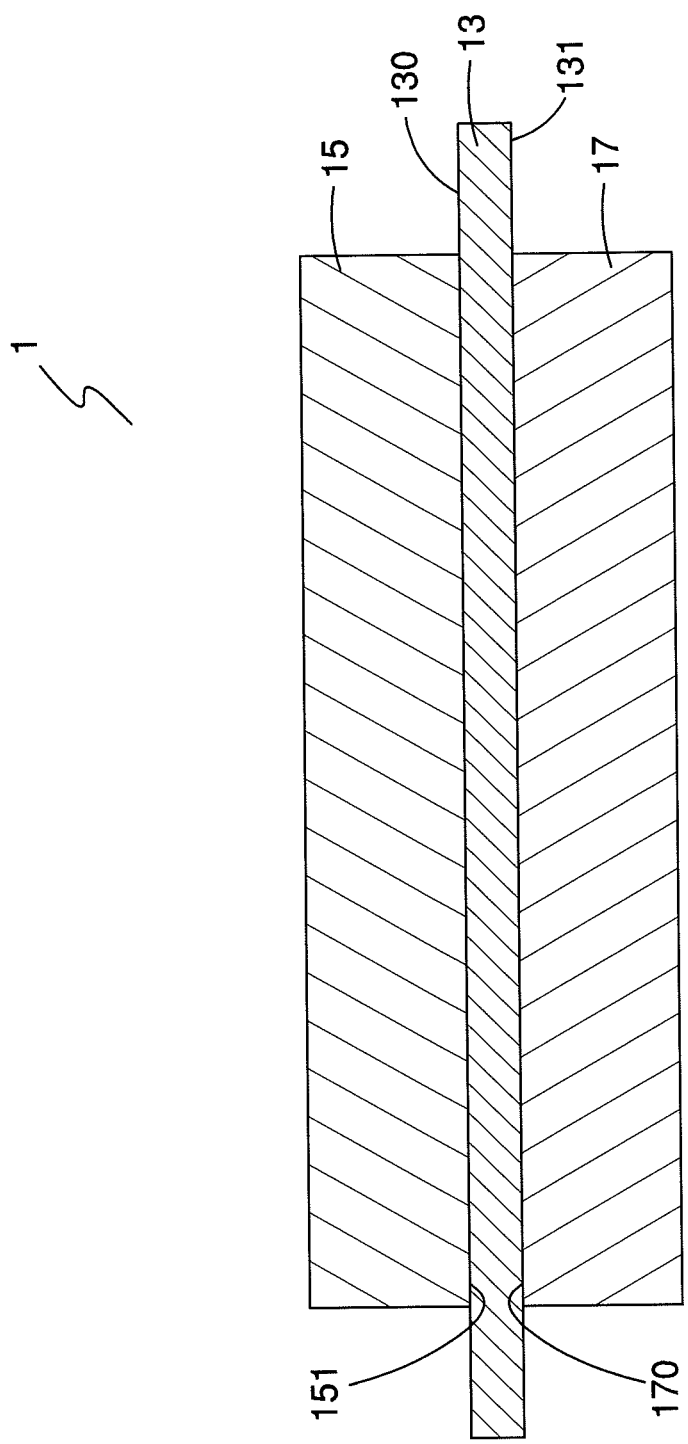
FIG. 3 is a cross-sectional view of the expanded laminate in accordance with the first embodiment of the present invention.

Moreover, as shown in FIG. 3, surface area of the top surface 130 of first plastic sheet 13 may be equal to or larger than surface area of the bottom surface 151 of the first expanded sheet 15, and surface area of the bottom surface 131 of the first plastic sheet 13 may also be equal to or larger than surface area of the top surface 170 of the second expanded sheet 17. This shows that the first plastic sheet 13 has a protruding portion protruding over the edges of the first and second expanded sheets 15 and 17, and the protruding portion of the first plastic sheet 13 can be used to combine with other objects.

Figure 4:
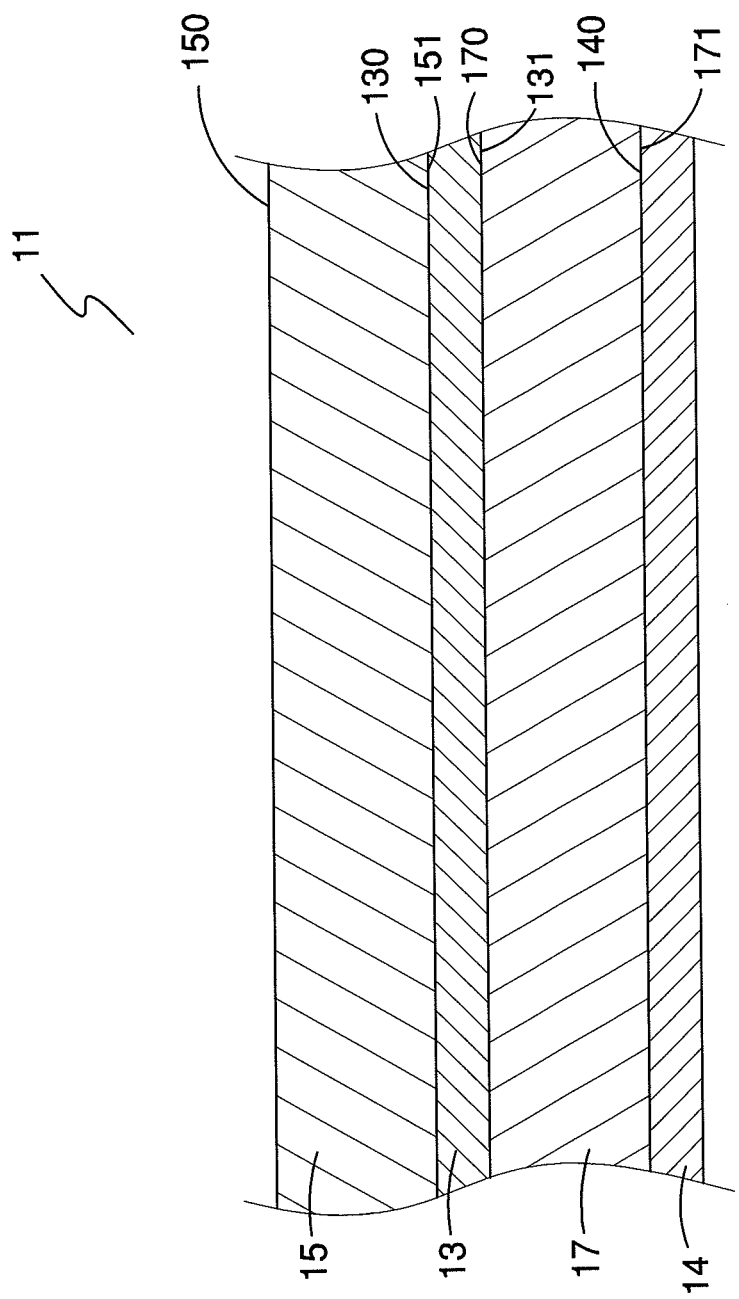
FIG. 4 is a partial cross-sectional view of an expanded laminate in accordance with the second embodiment of the present invention.

Referring now to FIG. 4, an expanded laminate 11 is shown in accordance with a second embodiment of the present invention. Compared with the expanded laminate 1 of the first embodiment shown in FIG. 1, the expanded laminate 11 of the second embodiment further comprises a second plastic sheet 14. The second plastic sheet 14 has a top surface 140 directly bonded to a bottom surface 171 of the second expanded sheet 17. Preferably, the top surface 140 of the second plastic sheet 14 and the bottom surface 171 of the second expanded sheet 17 are melted together since that the second plastic sheet 14 is bonded to the second expanded sheet 17 by using the same method which is used to bond the first plastic sheet 13 to the first expanded sheet 15 and the second expanded sheet 17 as shown in FIG. 2. Specifically, the expanded laminate 11 is made by the steps described below. Firstly, the expanded laminate 1 of the first embodiment is provided and directed into a gap between two rollers while the second plastic sheet 14 in a molten form is extruded from an extruder and directed into a gap between the expanded laminate 1 and one of the two rollers. Then, the two rollers are driven to roll and the molten second plastic sheet 14 is bonded to the second expanded sheet 17.

Figure 5:
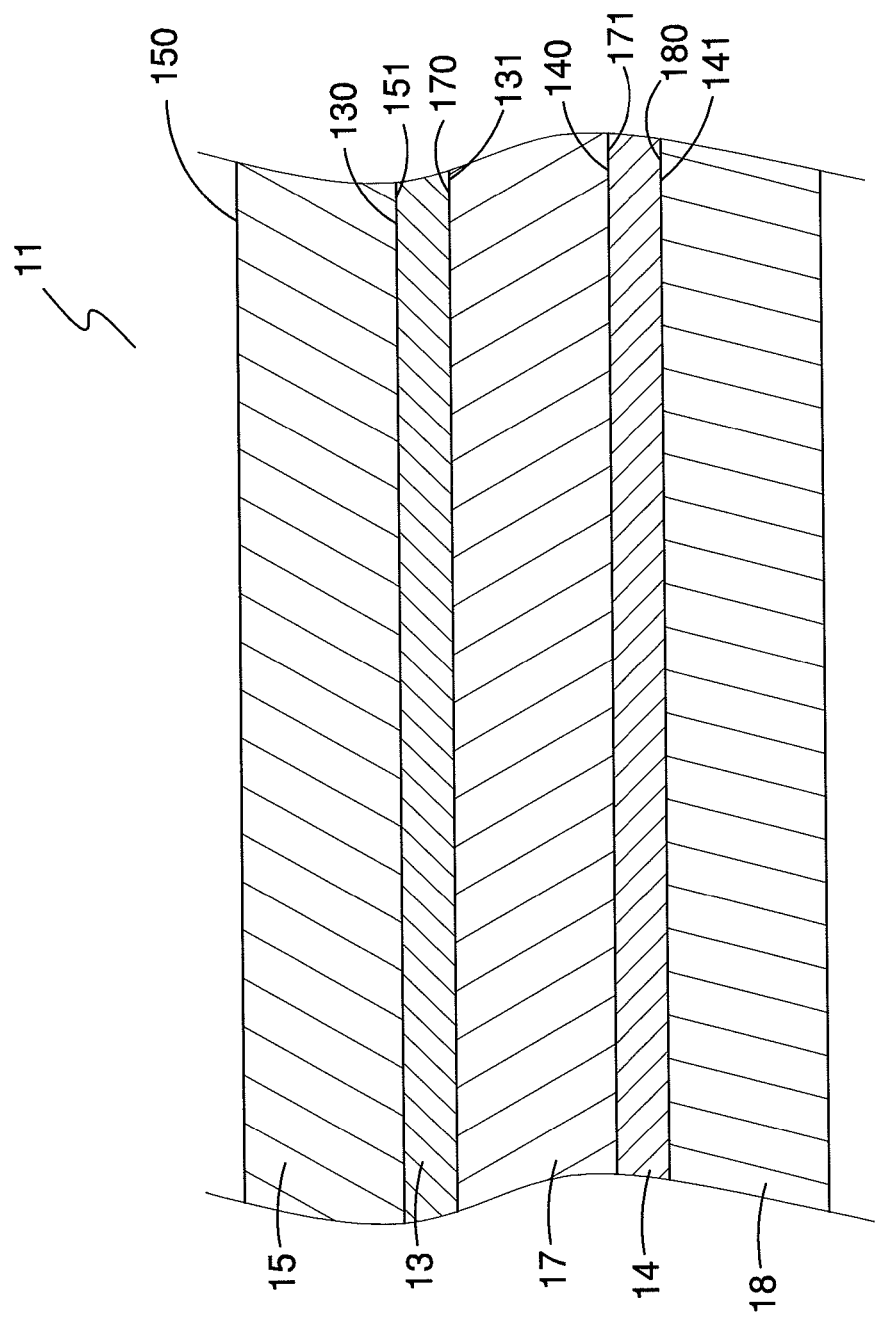
FIG. 5 is a partial cross-sectional view of the expanded laminate in accordance with the second embodiment of the present invention which further has a third expanded sheet.

Moreover, as shown in FIG. 5, the expanded laminate 11 may further include a third expanded sheet 18 having a top surface 180 directly bonded to a bottom surface 141 of the second plastic sheet 14. Specifically, the top surface 180 of the third expanded sheet 18 is melted together with the bottom surface 141 of the second plastic sheet 14. Thus, the expanded laminate 11 has improved ability to cushion impacts transferring from outside thereof. It should be noted that the expanded laminate can further include more plastic sheets and expanded sheets laminated in interval sequentially according to different needs.

Figure 6:
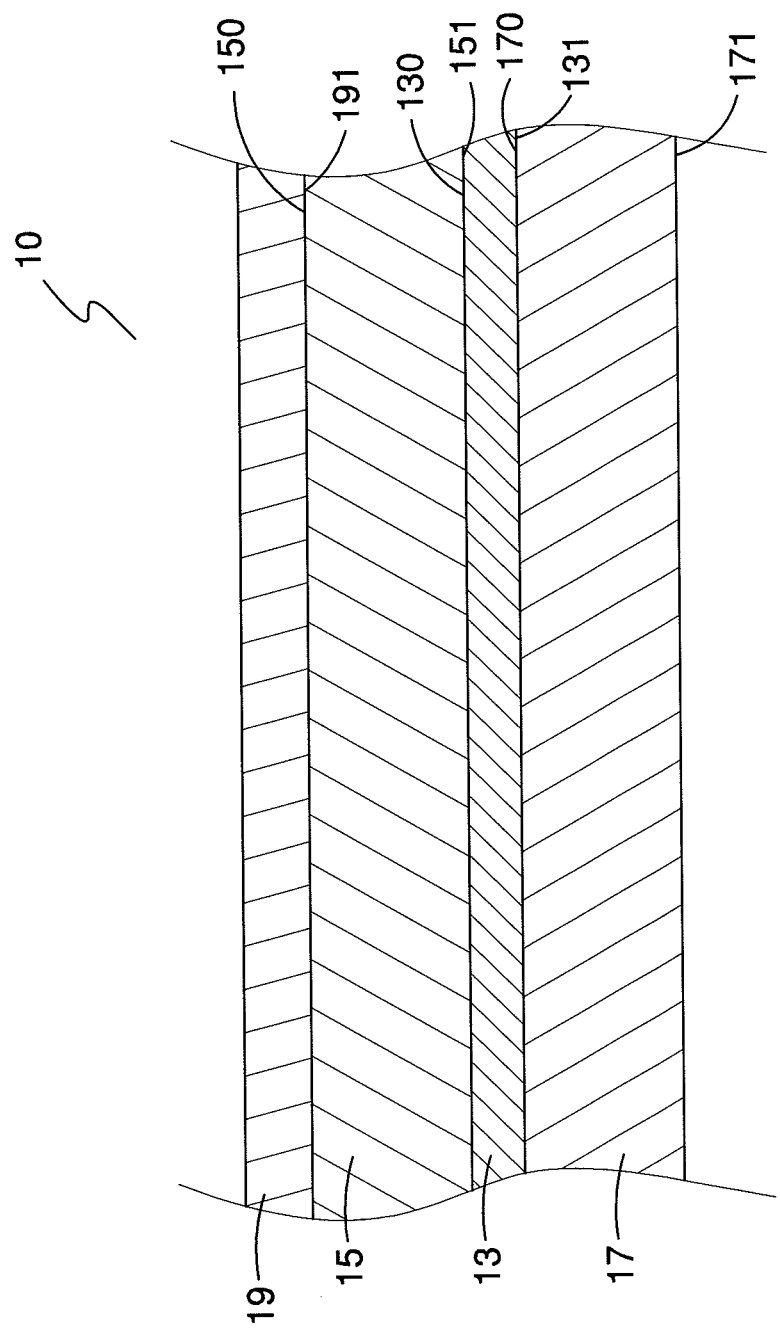
FIG. 6 is a partial cross-sectional view of an expanded laminate in accordance with the third embodiment of the present invention.

Referring now to FIG. 6, an expanded laminate 10 is shown in accordance with a third embodiment of the present invention. Compared with the expanded laminate 1 of the first embodiment shown in FIG. 1, the expanded laminate 10 of the third embodiment further comprises a protective outer layer 19 thereon. The outer layer 19 has a bottom surface 191 bonded to a top surface 150 of the first expanded sheet 15. Thus, the top surface 150 of the first expanded sheet 15 is covered by the outer layer 19. Preferably, the outer layer 19 may comprises a material selected from the group consisting of epoxy resin, fiberglass, carbon fiber, Surlyn® resin, polyurethane (PU), thermoplastic polyurethane (TPU), thermoplastic elastomer (TPE), fabric (for example, natural fabric, artificial fabric and nonwoven fabric) and expanded material. In addition, the outer layer 19 may be a multi-layer structure including a plurality of layers which may be made of the same materials or be made of different materials.

Figure 7:
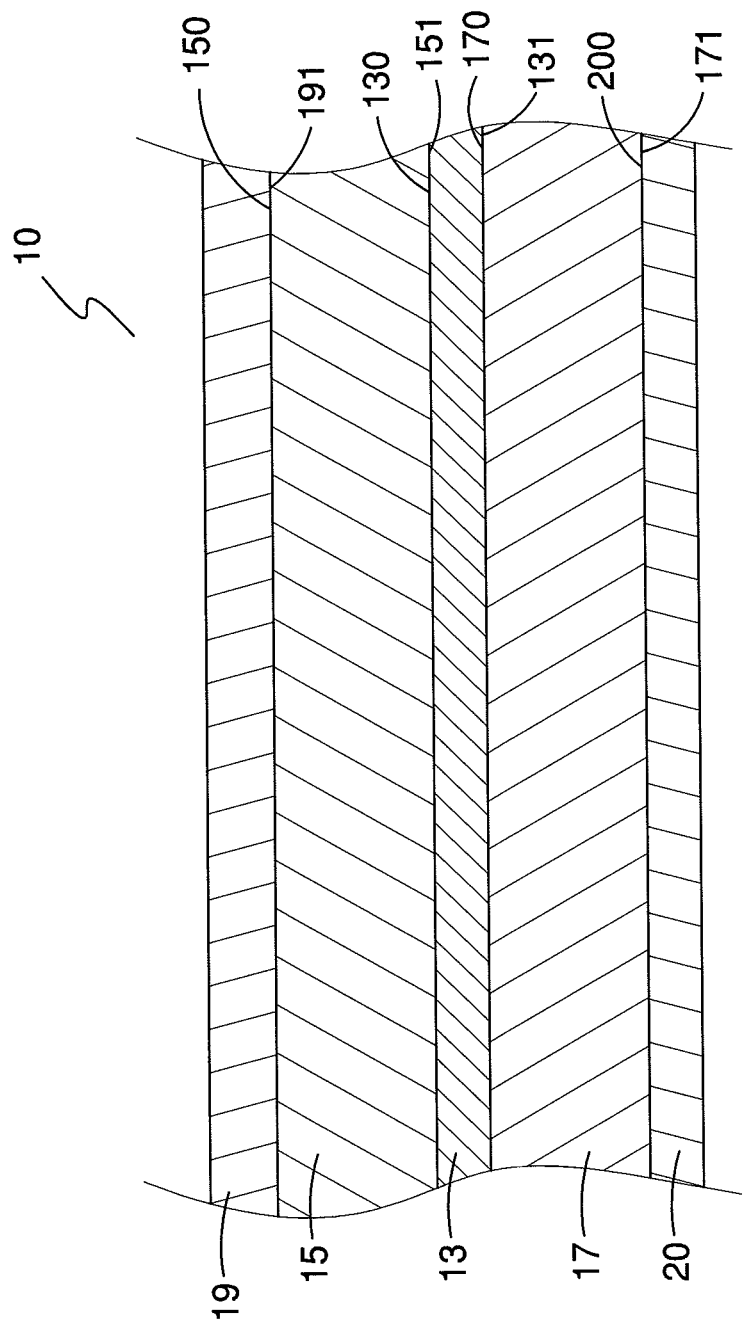
FIG. 7 is a partial cross-sectional view of the expanded laminate in accordance with the third embodiment of the present invention which further has an inner layer.

Referring to FIG. 7, the expanded laminate 10 may further include an inner layer 20 which has a top surface 200 bonded to the bottom surface 171 of the second expanded sheet 17. Preferably, the inner layer 20 comprises a material selected from the group consisting of epoxy resin, fiberglass, carbon fiber, Surlyn® resin, polyurethane (PU), thermoplastic polyurethane (TPU), thermoplastic elastomer (TPE), fabric (for example, natural fabric, artificial fabric and nonwoven fabric) and expanded material. In addition, the outer layer 19 may be a multi-layer structure including a plurality of layers which may be made of the same materials or be made of different materials.

Figure 8A:
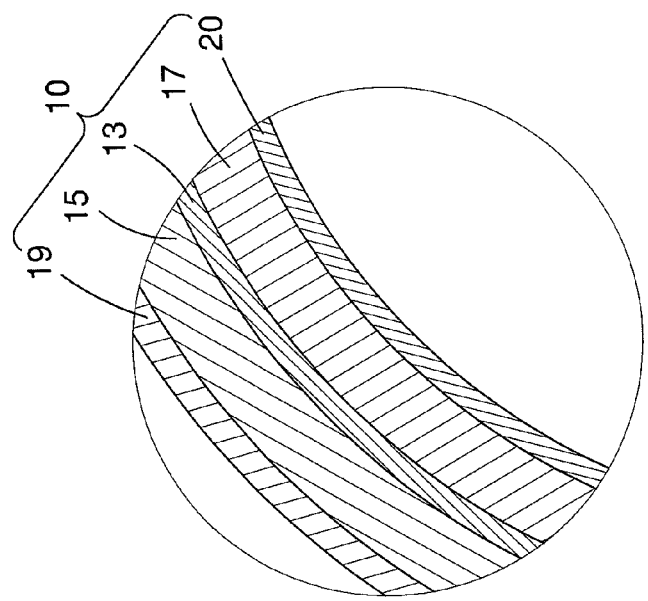
FIG. 8A is an enlarged cross-sectional drawing of area "A" in FIG. 8.
Figure 8:
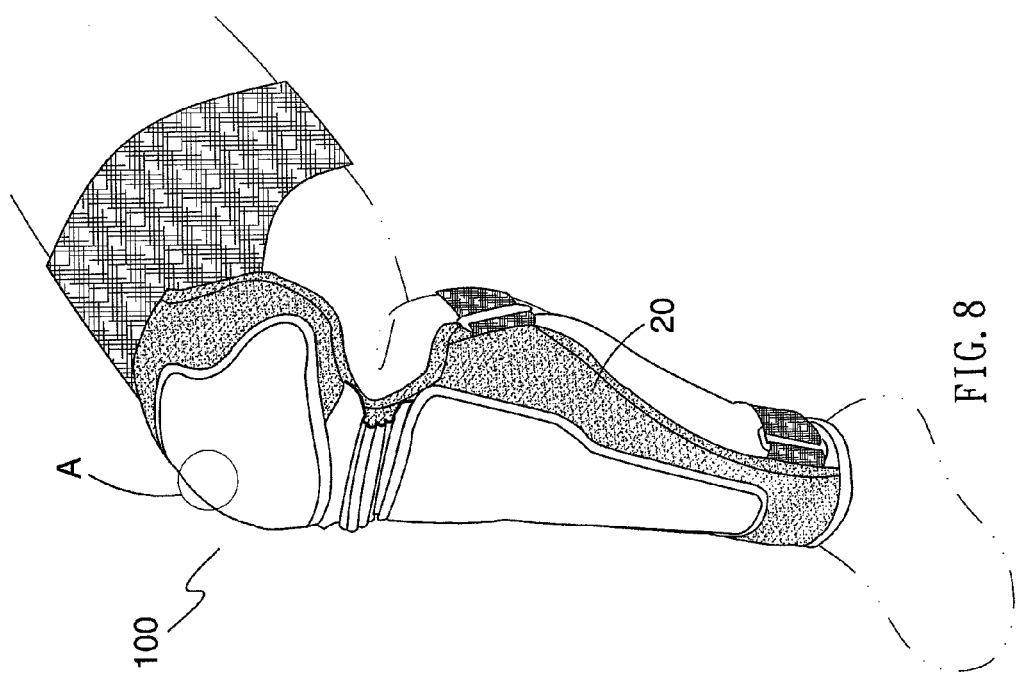
FIG. 8 is a perspective view of a knee cap including the expanded laminate shown in FIG. 7.
Figure 9:
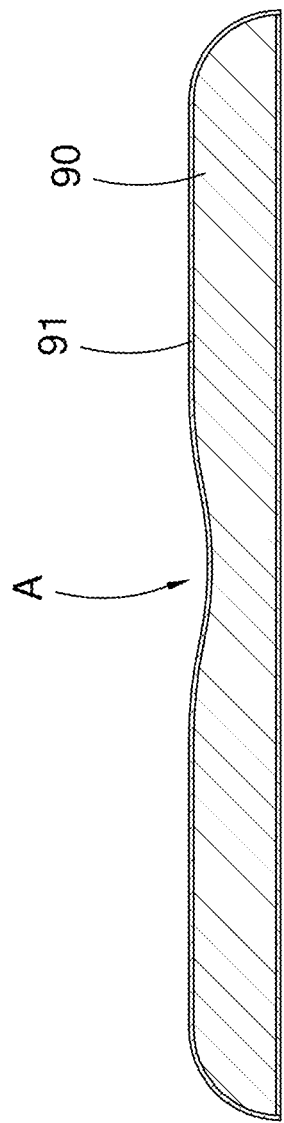
FIG. 9 is a cross-sectional view of conventional expanded materials of the prior art.

FIG. 8 is a perspective drawing showing a protective gear. FIG. 8A is an enlarged cross-sectional drawing of area "A" in FIG. 8. As shown in FIG. 8, the protective gear, for example, can be a knee cap 100. The knee cap 100 includes the expanded laminate 10 (as shown in FIG. 7). The inner layer 20 of the expanded laminate 10, such as a fabric layer, is located on an internal side of the knee cap 100. Turning now to FIG. 8A, the protective outer layer 19 of the expanded laminate 10, such as a plastic layer, is located on an external side of the knee cap 100. When the knee cap 100 is hit or otherwise impacted, the expanded laminate 10 cushions and distributes the impact forces. Therefore, the knee cap 100 is protected from permanent dents or fractures.

It should be noted that the different expanded laminates 1, 11 and 10 as abovementioned may be applied to a variety of products, for example, a riding board, a shoe pad, a yoga pad, a helmet, a trunk and so on, which have functions of cushioning and distributing impacts, shock and even compressive forces.

The foregoing description of the embodiments of the invention has been presented for the purposes of illustration and description. It is not intended to be exhaustive or to limit the invention to the precise forms or methods disclosed. Persons skilled in the relevant art can appreciate that many modifications and variations are possible in light of the above teachings.

The invention claimed is:

1. An expanded laminate comprising:
a first plastic sheet having a top surface, a bottom surface and a thickness between 0.05 mm and 1 mm, wherein the first plastic sheet is a low-density polyethylene plastic sheet, a medium-density polyethylene plastic sheet, a high-density polyethylene plastic sheet, a polypropylene plastic sheet, a polycarbonate plastic sheet or an ionomeric ethylene copolymer plastic sheet;
a first expanded sheet having a top surface, and a bottom surface, a foam density between 1.2 pcf and 8 pcf and a thickness between 1 mm and 8 mm, wherein the first expanded sheet is made of a material selected from the group consisting of expanded polyethylene and expanded polypropylene; the bottom surface of the first expanded sheet is directly bonded to the top surface of the first plastic sheet;
a second expanded sheet having a top surface, and a bottom surface, a foam density between 1.2 pcf and 8 pcf and a thickness between 1 mm and 8 mm, wherein the second expanded sheet is made of a material selected from the group consisting of expanded polyethylene and expanded polypropylene; the top surface of the second expanded sheet is directly bonded to the bottom surface of the first plastic sheet; and
a second plastic sheet having a top surface bonded to the bottom surface of the second expanded sheet;
wherein the first plastic sheet is tough and able to cushion and distribute impacts exerted thereon through the first expanded sheet or the second expanded sheet;
wherein surface area of the top surface of the first plastic sheet is larger than surface area of the bottom surface of the first expanded sheet; and surface area of the bottom surface of the first plastic sheet is larger than surface area of the top surface of the second expanded sheet; surface area of the top surface of the first plastic sheet is the same as surface area of the bottom surface of the first plastic sheet such that the first plastic sheet has a protruding portion over the edges of the first and second expanded sheets.

2. The expanded laminate of claim 1, wherein the first expanded sheet includes a plurality of expanded layers.

3. The expanded laminate of claim 1, wherein the second expanded sheet includes a plurality of expanded layers.

4. The expanded laminate of claim 1, wherein the first and second expanded sheets respectively include a plurality of expanded layers.

5. The expanded laminate of claim 1 further comprising an outer layer having a bottom surface bonded to a top surface of the first expanded sheet, and the outer layer comprising a material selected from the group consisting of epoxy resin, fiberglass, carbon fiber, ionomeric ethylene copolymer, polyurethane (PU), thermoplastic polyurethane (TPU), thermoplastic elastomer (TPE), fabric and expanded material.

6. The expanded laminate of claim 1, wherein the top surface of the first plastic sheet and the bottom surface of the first expanded sheet are melted together, and the bottom surface of the first plastic sheet and the top surface of the second expanded sheet are melted together.

7. The expanded laminate of claim 1, wherein the top surface of the first plastic sheet and the bottom surface of the first expanded sheet are melted together; the bottom surface of the first plastic sheet and the top surface of the second expanded sheet are melted together; and the top surface of the second plastic sheet and the bottom surface of the second expanded sheet are melted together.

8. The expanded laminate of claim 1 further comprising a third expanded sheet having a top surface bonded to a bottom surface of the second plastic sheet.

9. The expanded laminate of claim 8 further comprising an inner layer having a top surface bonded to a bottom surface of the third expanded sheet, and the inner layer comprising a material selected from the group consisting of epoxy resin, fiberglass, carbon fiber, ionomeric ethylene copolymer, polyurethane (PU), thermoplastic polyurethane (TPU), thermoplastic elastomer (TPE), fabric and foam material.

10. The expanded laminate of claim 8, wherein the top surface of the first plastic sheet and the bottom surface of the first expanded sheet are melted together; the bottom surface of the first plastic sheet and the top surface of the second expanded sheet are melted together; the top surface of the second plastic sheet and the bottom surface of the second expanded sheet are melted together; and the bottom surface of the second plastic sheet and the top surface of the third expanded sheet are melted together.

11. An expanded laminate comprising:
a first plastic sheet having a top surface, a bottom surface and a thickness between 0.05 mm and 1 mm, wherein the first plastic sheet is a low-density polyethylene plastic sheet, a medium-density polyethylene plastic sheet, a high-density polyethylene plastic sheet, a polypropylene plastic sheet, a polycarbonate plastic sheet or an ionomeric ethylene copolymer plastic sheet;
a first expanded sheet having a top surface and a bottom surface, wherein the bottom surface of the first expanded sheet is directly bonded to the top surface of the first plastic sheet, wherein the first expanded sheet is made of a material selected from the group consisting of expanded polyethylene and expanded polypropylene; and
a second expanded sheet having a top surface and a bottom surface, wherein the top surface of the second expanded sheet is directly bonded to the bottom surface of the first plastic sheet; wherein the second expanded sheet is made of a material selected from the group consisting of expanded polyethylene and expanded polypropylene;

wherein the first plastic sheet is tough and able to cushion and distribute impacts exerted thereon through the first expanded sheet or the second expanded sheet;

wherein surface area of the top surface of the first non-expanded plastic sheet is larger than surface area of the bottom surface of the first expanded sheet; and surface area of the bottom surface of the first plastic sheet is larger than surface area of the top surface of the second expanded sheet; surface area of the top surface of the first plastic sheet is the same as surface area of the bottom surface of the first plastic sheet such that the first plastic sheet has a protruding portion over the edges of the first and second expanded sheets.

12. The expanded laminate of claim 11 further comprising an inner layer having a top surface bonded to a bottom surface of the second expanded sheet, and the inner layer comprising a material selected from the group consisting of epoxy resin, fiberglass, carbon fiber, ionomeric ethylene copolymer, polyurethane (PU), thermoplastic polyurethane (TPU), thermoplastic elastomer (TPE), fabric and expanded material.

13. The expanded laminate of claim 11 further comprising an outer layer having a bottom surface bonded to a top surface of the first expanded sheet, and the outer layer comprising a material selected from the group consisting of epoxy resin, fiberglass, carbon fiber, ionomeric ethylene copolymer, polyurethane (PU), thermoplastic polyurethane (TPU), thermoplastic elastomer (TPE), fabric and expanded material.

14. The expanded laminate of claim 11, wherein the first and second expanded sheets have a foam density between 1.2 pcf and 8 pcf and a thickness between 1 mm and 8 mm.

\* \* \* \* \*